June 7, 1938.   R. H. HART   2,120,177
PARACHUTE
Filed July 6, 1936
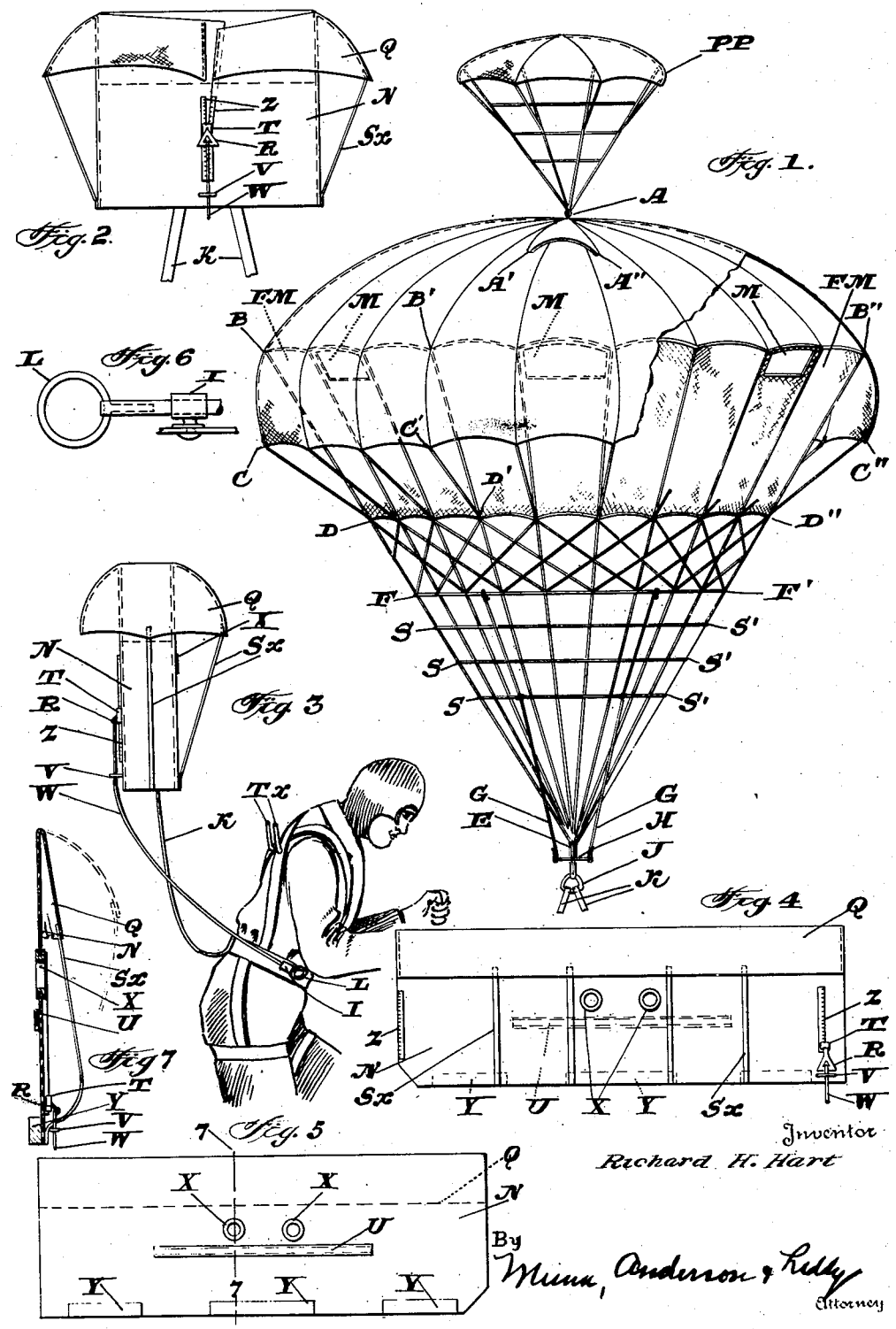

Patented June 7, 1938

2,120,177

UNITED STATES PATENT OFFICE 2,120,177

PARACHUTE

Richard H. Hart, New Orleans, La.

Application July 6, 1936, Serial No. 89,207

3 Claims. (Cl. 244—142)

My invention relates to improvements in parachutes and containers therefor, and it consists in the combinations, constructions, and arrangements hereinafter described and claimed.

Users of parachutes have in many cases lost their lives, not through any structural failure of the apparatus, but through physical or mental incapacity of the wearer to effect release of his parachute. A device providing automatic release would have prevented a large proportion of such loss of life.

The objections which have been raised against the use of self-releasing mechanisms for parachutes are (1) the mechanism is often not sufficiently positive in its operation, (2) the parachute would have a tendency to become fouled, and thus delayed in opening, and (3) the parachute might have a tendency to be slow in opening for other reasons. Therefore:

One object of my invention is to provide a quick-opening parachute which is so constructed as to be substantially non-fouling, and A further object is to provide a container for the parachute which will automatically release the latter, and which may also be manually operated at will.

My invention is illustrated in the accompanying drawing forming part of this application, in which:

Figure 1 is a side elevation of one embodiment of the parachute fully distended, Figure 2 is a side elevation of the parachute container in the process of release, Figure 3 is a side view of the container at the moment after leaving the carrying position, Figure 4 is a view of the exterior of the fully open container, Figure 5 is an interior view of the fully open container, Figure 6 is an enlarged view of the extremity of the ripcord, and Figure 7 is an enlarged detail view along the line 7—7 of Figure 5.

Referring more particularly to Figure 1, it will be seen that the parachute has a canopy ACC'', to which are attached the suspension lines BE, B'E, etc., the points of attachment B, B', B'', etc., being above the lower edge CC'' of said canopy, a section BCC''B'' of the canopy being left below said points of attachment for reasons hereinafter set forth.

The suspension lines BE, B'E, B''E, etc., are prevented from fouling or tangling by any or all of the following means: by their attachment to some flexible material FM, as shown in the section BDD''B''; by their attachment to each other to form a network or series of meshes as in section DFF''D'', or by the attachment thereto of cross lines or shrouds SS'.

The suspension lines are gathered together at the point E near their lower extremity and maintained as a unit by any convenient means to the point of their attachment to the suspension ring J. The lower section BCC''B'' of the canopy is restrained from collapse upward during the operation of the parachute by a number of auxiliary suspension lines CD, C'D, etc., said auxiliary suspension lines being attached to the lower edge of the canopy at the points C, C', etc., and to the suspending member or members of the parachute at the points D, D', etc. An essential feature of this invention is that the compound distances BCD, B'C'D', B''C''D'', etc., must be greater than the corresponding distances BD, B'D', B''D'', etc., to the end that the lower section BCC''B'' of the canopy shall remain free of tension from the load when the parachute is extended but not yet distended.

The flexible material shown in the section BDD''B'' may be provided with openings such as those shown at M to allow the passage of entrapped air from the outer portion of the canopy to the inner portion and vice versa, in order to maintain equal distension of the entire canopy. These openings may be of any suitable size or shape. It will be seen that in addition to its functions of eliminating fouling and of suspending or aiding to suspend the load the flexible material forms in effect a funnel-shaped auxiliary parachute.

Upon the outer side of the canopy and near or contiguous to its apex is an inverted pocket AA'A'' constructed of material flexible or resilient and preferably waterproof; the pocket has a greater periphery than the periphery of that segment of the canopy to which it is attached. The pocket is secured at its side edges, that edge farthest from the apex being free so that air may enter the pocket to assist in extending and distending the parachute. In order to insure the opening of this pocket a strip of stiff rubber (not shown) may be attached to the pocket along the line A'—A''. A plurality of such pockets may be used.

At PP I have shown a pilot parachute which may be attached to the main parachute at A, which if used should incorporate the principal features of the main parachute above described.

Because of its departure from the conventional suspending means, it has been found desirable to provide for the parachute a separate steering device. In Figure 1 it will be observed that I have provided a horizontal ring H circumscribing the suspending members at a point where it may be readily manipulated by the wearer of the apparatus, this ring being attached to the suspending members by a plurality of steering lines G. These steering lines are preferably of material both flexible and resilient, such as rubber-sheathed cord.

Straps K are attached to the suspension ring J, these straps being in turn attached to a harness which suspends the user of the parachute.

The parachute container comprises a sheet N of flexible material such as shown in Figure 4. Attached near the ends are the two halves of a separable slide fastener Z, commonly called a zipper. The parachute is designed to be folded and wrapped in this container. In order to provide a support for the parachute I make use of a plurality of blocks or ridges Y secured to the inner face of the container along its lower edge, these ridges being preferably resilient and attached to the container by any convenient means so that when the container is closed the blocks or ridges form a support for the parachute and a more or less complete floor for the container.

Attached to the envelope by a sleeve or other convenient means is a leaf spring U of metal or other resilient material which will urge the envelope to open when the extremities of the envelope or container are released by the zipper, so as to allow the unobstructed escape of the parachute. A plurality of such springs may be used.

A most important feature of the container consists in a hood or flap Q which may be formed by folding outwardly and downwardly an extension of the upper portion of the envelope as shown in Figure 4. The lower or free edge of the hood is secured by means of stays Sx to prevent the hood from collapsing upwardly. The function of this hood is to provide resistance to the air encountered while falling, thus causing the container to pull away from the wearer and against the release mechanism.

Referring to Figure 2 it will be seen that the release mechanism consists in the separable slide fastener Z as already stated, cooperating with which is a traveler T, a ripcord W, a ring R connecting the traveler to the ripcord, a ring-shaped or tunnel-shaped guide V to insure a direct pull by the ripcord upon the traveler, a stemmed ring L attached to the extremity of the ripcord and adapted to be grasped manually by the wearer of the apparatus, and a keeper I of any suitable material and adapted to be fastened to the wearer's harness or apparel, preferably to the inner side of the harness. The function of the keeper is to maintain the extremity of the ripcord and the stemmed ring L attached thereto in a position convenient for the manual grasping of the ring by the wearer. More important, however, this construction provides a means of so anchoring the ripcord that the pulling away of the container from the wearer will result in actuating the release mechanism and freeing the parachute from the container.

For its attachment to the wearer the parachute container is provided with a plurality of encircling or suspending devices such as grommets X located at any convenient points, preferably above its center of gravity, and adapted to slip readily over corresponding upwardly inclined studs Tx attached to the wearer's harness in such a manner that an outward or upward pull will result in lifting the container from the studs and permitting the release mechanism to function automatically.

In packing the parachute it is first extended, then folded in a zigzag manner to a compact mass, no paper or other inserts being necessary. The folded parachute is then laid upon the interior side of the open envelope or container with the apex of the canopy uppermost and outermost, care being taken to leave the upper one-third of the container empty or practically empty, in order to provide a feathering effect which will automatically maintain the container in an upright position until the release mechanism has functioned.

If a pilot parachute be used, it should be placed in the upper third of the envelope. The envelope is then so folded as to enclose the parachute, and the pilot parachute if any be used. The ends of the envelope or container are then brought together and are united by means of the operating traveler and the closure completed. The ripcord is of such length that when the slide fastener is completely closed the pull ring will be drawn snugly against the keeper, and the stem, shown in dotted lines in Figure 6, encompassed thereby, with the result that the pull ring is maintained in a position for ready grasping by the wearer. The ripcord is shorter than the straps K, in order that it may complete its function before the latter becomes taut. After packing, the container is attached to the wearer by simply hanging it by its grommets or other suspending devices upon the upwardly inclined studs attached to his harness or apparel.

To operate the parachute it is only necessary for the wearer to leap, fall, or be thrown clear of his aircraft. The force of the air encountered during descent, acting upon the resisting hood, draws the container away from the wearer, thus pulling against and operating the release mechanism and freeing the parachute. As soon as the freed parachute encounters the air-stream it is extended thereby, the inverted pockets at the apex, and the pilot parachute, if any, contributing to such extension by their resistance to the air.

When the parachute is fully extended, the lower portion of the canopy remains free from tension and therefore readily entraps the air which it encounters, thus inflating and distending the canopy and checking the velocity of descent.

The release mechanism may be operated manually at the pleasure of the wearer by simply grasping and pulling upon the pull ring L attached to the extremity of the ripcord W. Should he desire a longer free fall than would normally result, he may prevent the automatic functioning of the release mechanism by manually grasping the lower portion of the container and preventing said container from being lifted from the studs until he has fallen the desired distance.

Because of its design and construction, the parachute herein described will be found to open more gradually after a prolonged free fall than other types of parachutes, with a consequent diminution of strain upon both wearer and apparatus.

To steer the parachute during descent, the wearer grasps the steering ring at the point nearest the direction in which he desires to make headway and pulls downward thereon, thereby shifting the center of gravity, with the result that the opposite edge of the canopy is raised sufficiently to allow the escape of air thereat and a propulsive effect is thus secured, the amount of such effect being governed by the force exerted, the size and elasticity of the steering ring, and the distance therefrom at which the steering lines are attached to the suspending members.

I claim:

1. In a parachute, a canopy comprising a main body portion, primary suspension means secured above the outer edges of said main body portion, said suspension means terminating substantially at a common central point, said body portion being prolonged to constitute an extension, a flexible fabric secured directly to the canopy adjacent the periphery of the main body portion at one end and extending to a point below the edge of the extension at the other to form a funnel-shaped member, said funnel-shaped member being provided with openings for the passage of air from one section of the canopy to the other.

2. In a parachute, a canopy comprising a main body portion, primary suspension means secured above the outer edges of said main body portion, said suspension means terminating substantially at a common central point, said body portion being prolonged to constitute an extension, a flexible fabric secured directly to the canopy adjacent the periphery of the main body portion at one end and extending to a point below the edge of the extension at the other to form a funnel-shaped member, said funnel-shaped member being provided with openings for the passage of air, and auxiliary inverted pockets secured to the outer surface of the main body portion near the center thereof.

3. The combination with a parachute having a canopy and suspending means, of a steering means comprising a steering ring encompassing the lower end of the suspending means, and cord members secured at one end to said suspending means and at the other to the steering ring.

RICHARD H. HART.